United States Patent Office 3,107,666
Patented Oct. 22, 1963

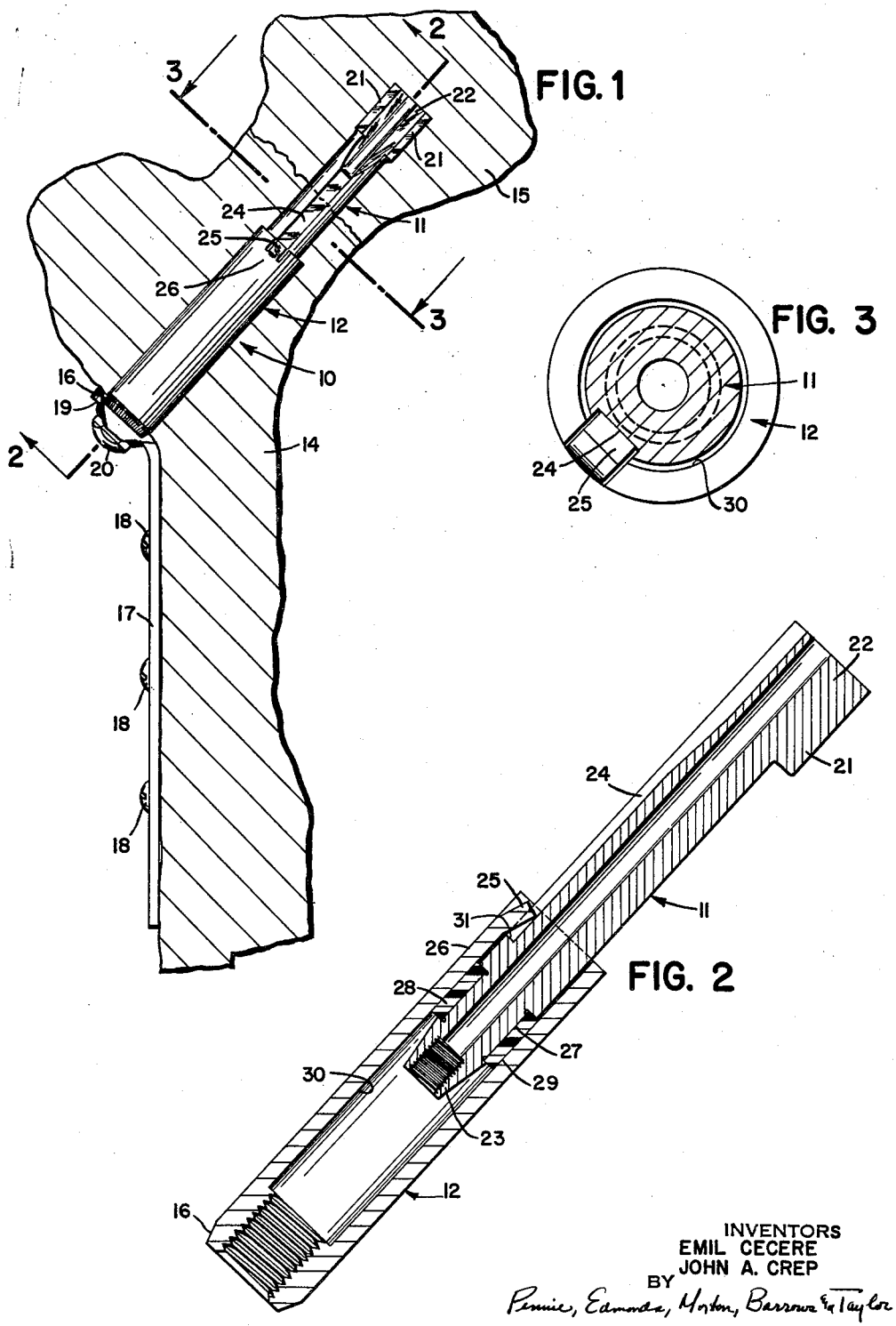

3,107,666
FRACTURE FIXATION NAIL
Emil Cecere, Wayne, N.J., and John A. Crep, Elmhurst, N.Y., assignors to Howe Sound Company, a corporation of Delaware
Filed July 17, 1961, Ser. No. 124,582
4 Claims. (Cl. 128—92)

This invention relates to self-adjusting devices for the fixation of fractured bones and, more particularly, to such a device having improved self-adjusting means.

Surgical fixation devices have long been used for maintaining fractured portions of bones together. They have had particularly wide application in the fixation of fractures of the hip, and especially fracture of the femoral neck. In such applications it has been found that rigid elements consisting essentially of a unitary nail have not been completely satisfactory in every case. This is principally due to the fact that subsequent to fixation of the fractured bone and during the healing process, absorption takes place causing a separation of the fractured portions. This separation prevents intimate contact of the fractured bone portions and thereby is detrimental to the natural healing process. When a unitary nail is employed and this absorption takes place, it is possible that unless the nail is sized properly, it will serve to hold the bone fragments apart. Moreover, if the unitary nail were not selected with care, it is possible that upon driving the nail into the femur head, it could become driven completely out of the head and thereby cause undue pain and injury to the patient. This led to the development of devices which have compensated for some of these difficulties and which consisted essentially of two parts; namely, a nail which is adapted to be driven into the femur head, and a sleeve securely attached within the adjoining portion of the fractured bone for supporting the nail in slidable relationship therewith. By means of these devices it was found that a substantially universal device could be employed for all similar type fractures since the nail was slidable and could be adjusted to extend to various lengths.

Moreover, by means of such devices, when absorption occurred during the healing process, the nail being in slidable relationship with the sleeve would be forced back into the sleeve by the superincumbent weight on the head of the femur and the muscle pull in that area, a distance dependent upon the separation caused by the necrosis and absorption which has taken place. Thus it was undesirable that the relative movement between the nail and the sleeve be too free and the elements were sometimes maintained in metal-to-metal friction contact to limit this longitudinal movement. This metal-to-metal contact is usually accomplished by including a hard metal tension element between the nail and sleeve, to maintain these two members in the tight frictional contact desired. It has been found however, that after the device has been installed in the bone for any length of time, the contact between the tension element and the sleeve, which may of dissimilar metals, or of the same metal but having different characteristics, may in the presence of body fluids cause an electro-chemical reaction. This electro-chemical reaction has sometimes resulted in an unexpected amount of corrosion in the form of pitting which is certainly undesirable when the device is to be left in the bone as a permanent support. Furthermore, attrition may occur between the nail and sleeve because of the metal-to-metal contact; thus it was not too surprising to find minute metal particles therefrom in the surrounding tissues with resultant tissue irritation.

We have found an improved means for controlling the relative longitudinal movement between such nails and sleeves, and other means for preventing rotational movement therebetween while at the same time restricting the range of the longitudinal movement so as to permit the device to be removed as a unit. In our new self-adjusting device we securely mount on the nail a plastic ring having a substantially cylindrical circumferential surface and a diameter slightly larger than the diameter of the nail body, such that it is in surface-to-surface contact with the sleeve. By means of this, the frictional resistance needed to control, but allow longitudinal movement of the nail relative to the body is provided without fear of electro-chemical attack or attrition as occurred in the device described above. Moreover, by limiting the range of longitudinal movement of the nail and sleeve relative to each other there is little chance of the nail and holder ever becoming completely separated or of the plastic ring being removed from the holder.

The present invention is incorporated in a self-adjusting device for the fixation of fractured bones of the type having a nail for penetration into a bone and a nail support for holding the nail in axially slidable relationship therewith. New means for controlling the movement of the nail relative to the support are provided. These means comprise an integral plastic ring mounted on that portion of the nail disposed within the support. The plastic ring has a larger outside diameter than the nail body and is in surface-to-surface frictional contact with this support whereby uniform frictional resistance to the longitudinal movement of the nail is provided.

A preferred embodiment of the invention is described hereinbelow with reference to the drawing wherein:

FIG. 1 is a side elevation of the self-adjusting device shown secured to the femoral shank and extending into the femoral head to fix a fracture along the femoral neck;

FIG. 2 is a section taken substantially along lines 2—2 of FIG. 1 and

FIG. 3 is a section taken along lines 3—3 of FIG. 1.

Referring initially to FIG. 1, the self-adjusting device 10 of the present invention consists essentially of a nail 11 and a holder 12. The holder 12 consists of a tubular sleeve in which the nail 11 is maintained in slidable relationship therewith. As shown, when the fracture to be fixed is that on the hip joint, the sleeve 12 extends into the oblique neck 13 of the femur at the end of the femur shank 14 and the nail is driven into the femur head 15. The sleeve 12 is serrated at its outermost end portion 16 and is held in fixed relation to the bone by means of a plate 17 which substantially conforms to the femur shank 14 and is secured thereto by means of screws 18. It is of course contemplated that the plate could be integrally connected to the sleeve 12. The plate 17 is serrated at its uppermost end portions 19 (which is broken away in FIG. 1) with serrations matching those formed on the end portion 16, thereby permitting the sleeve 12 to be received in firm locking engagement with the plate 17. The end portion 16 of the sleeve 12 is internally threaded as shown in FIG. 2. A bolt 20 is threaded into the internally threaded sleeve 12 causing the matching serrated portions of the plate 17 and sleeve to be securely locked together and maintaining the nail and sleeve rigidly within the bone.

The nail 11 has three flanges 21 extending radially from its outermost end portion 22. Any number of flanges which might prove feasible could of course be employed. An axial bore extends through the nail 11 and may be internally threaded at its end portion 23 opposite the end portion 22 on which the flanges 21 are formed. The purpose of this threaded portion on the nail 11 is to permit an adjustment device to be inserted therein for purposes of driving and positioning the nail properly within the bone as well as for removing the nail if it should inadvertently become separated from the sleeve 12. A keyway 24 is cut longitudinally in the nail 11. A key 25 is formed on the end 26 of the tubular sleeve 12 opposite to the serrated end 16 and is depressed into and slidable within the keyway 24 to prevent separation of the nail 11 from the sleeve and to prevent rotational movement between these two members.

As best shown in FIG. 2, disposed within a circumferential slot 27 formed at substantially the end portion 23 of the nail body is an integral polytetrafluoroethylene ring 28. Polytetrafluoroethylene has been most successfully used as the material for the ring 28 thus far, but it is proposed that chlorotrifluoroethylene, heat resistant polyethylene and polypropylene, as well as certain types of nylon are materials suitable for this application. This end portion 23 of the nail 11 tapers to a smaller diameter from the slot 27 to its extreme end to permit ease of inserting the integral ring onto the nail body. The ring 28 has a larger outer diameter than the nail body between the end portions 22 and 23 thereof, and a cylindrical surface 29, and is of such a diameter that it is in surface-to-surface frictional contact with the internal cylindrical surface 30 of the sleeve 12. By means of this frictional engagement between the polytetrafluoroethylene ring 28 and the internal cylindrical surface 30 of the sleeve 12, longitudinal movement of the nail 11 is greatly resisted. Longitudinal movement of the nail 11 within the sleeve 12 is permitted however, when rather strong forces such as can be expected from the superincumbent weight of the injured person's body as well as muscle tension in this area, are applied against the femur head 15 and axially to the nail 11. Although fracture fixation devices of this type are intended to hold the fractured bones in alignment during a period of bone healing and are not intended for direct weight-bearing, as the healing advances and complete immobilization is no longer necessary, superincumbent forces will be applied to the femur head, and as absorption takes place the nail will adjust itself so that the fractured portions of the bone are maintained in close contact.

It is also to be noted that the keyway terminates at the stop 31. Hence, when the unit is being removed from the bone, the nail 11 will be held rather tightly within the bone and the sleeve 12 will slide out relative to the nail until the key 25 abuts the stop 31. When the key 25 is abutting the stop 31 as described, the nail 11 and sleeve 12 can now be completely removed as a unit.

It is obvious that owing to the relatively large area of the cylindrical surface 29 of the ring 28, uniform friction can be maintained between the sleeve 12 and the ring 28 to resist axial movement of the nail 11, and yet allow movement of the nail into the sleeve when weight or muscle tension tends to compress the fractured portions of the bone together. Moreover, the plastic ring is inert to chemical attack by body fluids and will not cause attrition between the members of the device so as to produce tiny metal particles which can be taken into the surrounding tissues. Hence, the new device can be permanently attached as an internal splint without concern that it will ultimately need to be removed for the reasons that devices having metal-to-metal contact therein might necessitate removal.

We claim:

1. In a self-adjusting device for fixation of fractured bones having a nail for penetration into a bone, and a nail support for holding the nail in axial slidable relationship therewith, means for controlling the movement of the nail relative to the support comprising an integral resinous plastic ring mounted about a portion of the nail disposed within the support, said plastic ring being of larger outside diameter than the nail body and in normally fixed surface-to-surface frictional contact with the support, whereby uniform frictional resistance to the longitudinal movement of the nail is provided.

2. In a self-adjusting device for fixation of fractured bones having a nail for penetration into a bone, and a nail support for holding the nail in axial slidable relationship therewith, means for controlling the movement of the nail relative to the support comprising a closed-end keyway on the body of said nail, a key on said support and slidable within said keyway limiting the longitudinal movement and preventing rotational movement of the nail relative to the support and permitting the device to be inserted and removed as a unit, and an integral plastic ring mounted about a portion of the nail disposed within the support, said plastic ring being of larger outside diameter than the nail body and in surface-to-surface frictional contact with said support, whereby uniform frictional resistance to the longitudinal movement of the nail is provided.

3. In a self-adjusting device for fixation of fractured bones having a nail for penetration into a bone, and a nail support for holding the nail in axial slidable relationship, means for controlling the movement of the nail relative to the support comprising a closed-end keyway on the body of said nail, a key on said support and slidable within said keyway thereby limiting the longitudinal movement and preventing rotational movement of the nail relative to the support and permitting the device to be inserted and removed as a unit, and an integral plastic ring having a cylindrical outer surface mounted about a portion of the nail disposed within the support, said plastic ring being of larger outside diameter than the nail body with its cylindrical surface in surface-to-surface frictional contact with said support, whereby uniform frictional resistance to the longitudinal movement of the nail is provided.

4. In a self-adjusting device for fixation of fractured bones having a nail for penetration into a bone, a nail support for holding the nail in axial slidable relationship, means for controlling the movement of the nail relative to the support comprising a closed-end keyway on the body of said nail, a key on said support and slidable within said keyway thereby limiting the longitudinal movement and preventing rotational movement of the nail relative to the support and permitting the device to be inserted and removed as a unit, and a polytetrafluoroethylene ring having a cylindrical outer surface mounted about the end portion of the nail disposed within the support, said ring being of larger outside diameter than the nail body with its cylindrical surface in surface-to-surface frictional contact with said support, whereby uniform frictional resistance to the longitudinal movement of the nail is provided.

References Cited in the file of this patent
UNITED STATES PATENTS

| | | |
|---|---|---|
| 2,702,543 | Pugh et al. | Feb. 22, 1955 |
| 2,761,444 | Luck | Sept. 4, 1956 |
| 2,844,125 | Wehn | July 22, 1958 |
| 2,861,268 | Tinsley | Nov. 18, 1958 |
| 3,011,813 | Arneson | Dec. 5, 1961 |